(12) United States Patent
Barsness et al.

(10) Patent No.: US 9,473,343 B2
(45) Date of Patent: *Oct. 18, 2016

(54) DYNAMIC PROCESSING UNIT RELOCATION IN A MULTI-NODAL ENVIRONMENT BASED ON INCOMING PHYSICAL DATA

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 657 days.

This patent is subject to a terminal disclaimer.

(21) Appl. No.: 13/708,942

(22) Filed: Dec. 8, 2012

(65) Prior Publication Data
US 2013/0097323 A1   Apr. 18, 2013

Related U.S. Application Data

(63) Continuation of application No. 12/914,249, filed on Oct. 28, 2010.

(51) Int. Cl.
*G06F 15/173* (2006.01)
*H04L 29/08* (2006.01)
*G06F 9/50* (2006.01)

(52) U.S. Cl.
CPC ....... *H04L 29/08144* (2013.01); *G06F 9/5033* (2013.01); *G06F 9/5044* (2013.01); *H04L 67/1002* (2013.01)

(58) Field of Classification Search
CPC ............... H04L 29/08144; H04L 67/1002; G06F 9/5033; G06F 9/5044
USPC ........................................................... 709/226
See application file for complete search history.

(56) References Cited

U.S. PATENT DOCUMENTS

| | | | |
|---|---|---|---|
| 2003/0105800 A1* | 6/2003 | Cullen | 709/201 |
| 2005/0125798 A1* | 6/2005 | Peterson | 718/105 |
| 2006/0184837 A1 | 8/2006 | Al-Omari | |
| 2007/0104114 A1 | 5/2007 | Chu et al. | |
| 2009/0063501 A1 | 3/2009 | Buckler et al. | |
| 2009/0228892 A1* | 9/2009 | Di Luoffo et al. | 718/104 |

* cited by examiner

*Primary Examiner* — Tonia L Dollinger
*Assistant Examiner* — Albert Chiou
(74) *Attorney, Agent, or Firm* — Martin & Associates, LLC; Bret J. Petersen

(57) ABSTRACT

A relocation mechanism in a multi-nodal computer environment dynamically routes processing units in a distributed computer system based on incoming physical data into the processing unit. The relocation mechanism makes an initial location decision to place a processing unit onto a node in the distributed computer system. The relocation mechanism monitors physical data flowing into a processing unit or node and dynamically relocates the processing unit to another type of node within the 'cloud' of nodes based on the type of physical data or pattern of data flowing into the processing unit. The relocation mechanism may use one or more rules with criteria for different data types observed in the data flow to optimize when to relocate the processing units.

10 Claims, 6 Drawing Sheets

DYNAMIC PROCESSING UNIT RELOCATION IN A MULTI-NODAL ENVIRONMENT BASED ON INCOMING PHYSICAL DATA

BACKGROUND

1. Technical Field

This disclosure generally relates to computer systems, and more specifically relates to dynamic processing unit (job) relocation in a multi-nodal computer system environment based on incoming physical data.

2. Background Art

Multi-nodal systems and distributed computing systems are increasingly being employed to overcome the limitations of traditional applications deployed in standard computing systems. Distributed computing refers to the use of distributed systems to solve computational problems. Multi-nodal computer systems and distributed computing systems as used herein may be any group or cluster of machines that are accessible by programmer applications to carry out tasks. A multi-nodal computing system consists of multiple autonomous computers or nodes that communicate through one or more networks. The multiple nodes in the computing system can be nodes of a single machine or consist of many machines connected together as a cluster or cloud of compute nodes. In multi-nodal or distributed computing, a problem is divided into many tasks, each of which is solved by one or more computer nodes. Distributed computing in a multi-nodal environment on a single machine can be exemplified by several of today's computing technologies such as IBM® Corporation's Blue Gene®, grid computing, commercial clusters, and IBM® Corporation's RoadRunner.

These new multi-nodal environments allow individual computer processing units to be linked to each other thru new programming paradigms such that a unit of work or a typical program is parsed out and computed in a distributed manner. Furthermore this spread of work is often left up to the system such that software designers have little or no way of knowing what pieces of the application or job, referred to herein as processing units, are running where. Where there are different nodes in the distributed computing system with different capabilities, the assignment of applications or processing units to the different nodes is important to the overall efficiency of the distributed system.

BRIEF SUMMARY

The disclosure and claims herein are directed to dynamic processing unit (job) relocation in a distributed computer system in a multi-nodal environment based on incoming physical data into a processing unit on a node. A relocation mechanism makes an initial relocation decision to place a processing unit onto a node in the distributed computer system. The relocation mechanism monitors physical data flowing into a processing unit or node and dynamically relocates the processing unit to another type of node within the multi-nodal system based on the type of physical data or pattern of data flowing into the processing unit. The relocation mechanism may use one or more rules with criteria for different data types observed in the data flow to optimize when to relocate the processing units.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Described herein is a system and method for dynamic processing unit (job) relocation in a distributed computer system in a multi-nodal environment based on incoming physical data into a processing unit on a node. A relocation mechanism makes an initial relocation decision to place a processing unit onto a node in the distributed computer system. The relocation mechanism monitors physical data flowing into a processing unit and dynamically relocates the processing unit to another type of node based on the type of physical data or pattern of data flowing into the processing unit. The relocation mechanism may use one or more rules with criteria for different data types observed in the data flow to optimize when to relocate the processing units.

Figure 1:
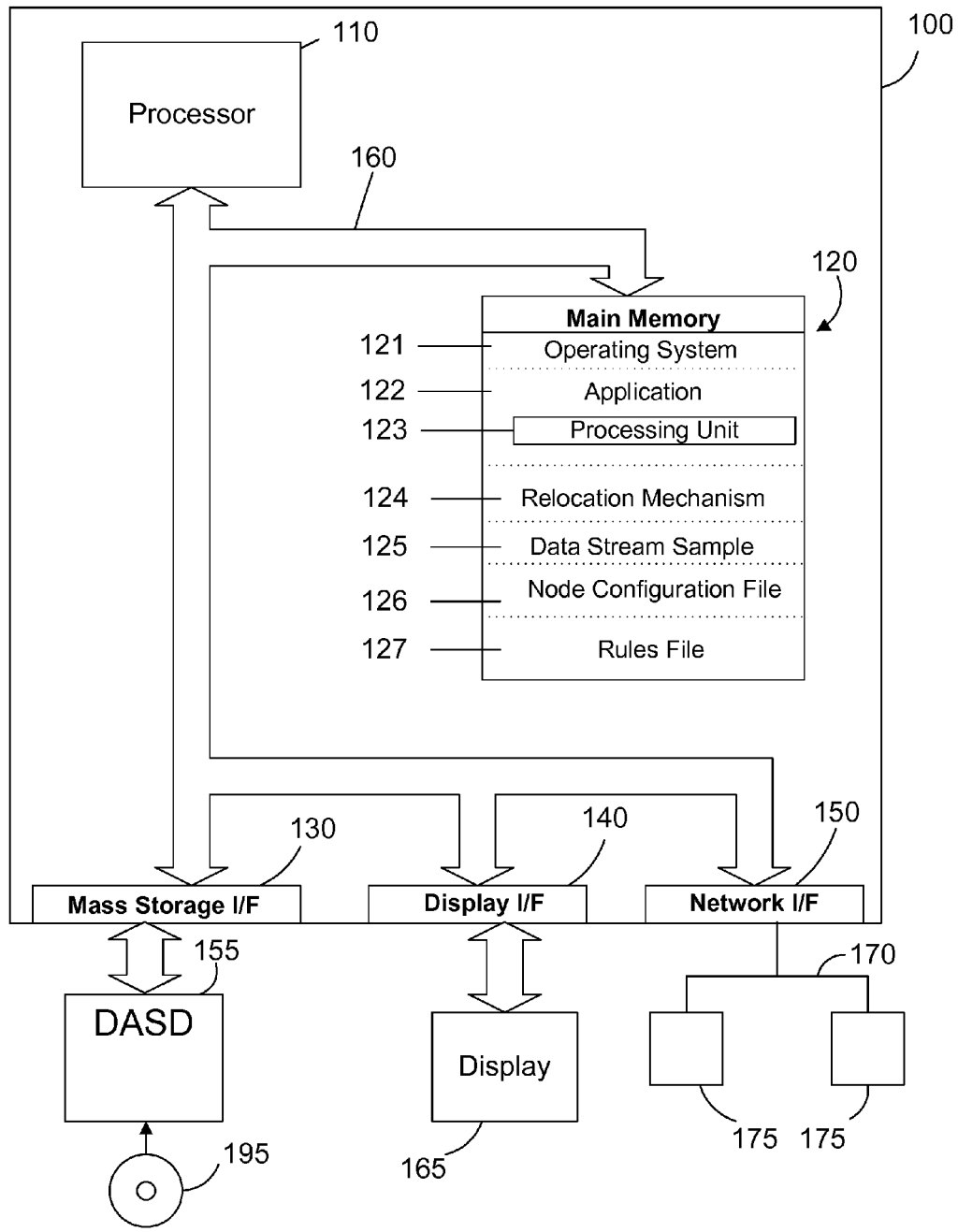
FIG. 1 is a block diagram of a computer system with a relocation mechanism that dynamically routes processing units in a multi-nodal computer environment based on incoming physical data as described herein.

Referring to FIG. 1, a computer system 100 is one suitable implementation of a computer system that includes a relocation mechanism as described herein. Computer system 100 is an International Business Machines Corporation (IBM®) Power System which can run multiple operating systems including the IBM® i operating system. However, those skilled in the art will appreciate that the disclosure herein applies equally to any computer system capable of being connected in a multi-nodal or distributing computing environment. For example, the computer system 100 could also represent a single node of a massively parallel computer such as IBM® Corporation's Blue Gene® computer system, or a node of a scalable performance cluster such as a Beowulf cluster. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices with a computer readable or computer recordable medium, such as direct access storage devices 155, to computer system 100. One specific type of direct access storage device 155 is a readable and writable CD-RW drive, which may store data to and read data from a compact disk (CD) 195.

Main memory 120 preferably contains an operating system 121. Operating system 121 is a multitasking operating system known in the industry as IBM® i operating system; however, those skilled in the art will appreciate that the spirit and scope of this disclosure is not limited to any one operating system. The memory further includes a software application 122 that comprises one or more processing units 123. The memory 120 includes a relocation mechanism 124 as described herein. The memory 120 may include a data stream sample 125 that is captured to monitor for changes in data type as described below. The memory 120 further includes a node configuration file 126 and a rules file 127 that hold information and rules used by the relocation mechanism 124 as described herein.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, application 122, relocation mechanism 124, data stream sample 125, the node configuration file 126, and the rules file 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the application 122 and the processing unit(s) 123.

Although computer system 100 is shown to contain only a single processor and a single system bus, those skilled in the art will appreciate that a relocation mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Figure 2:
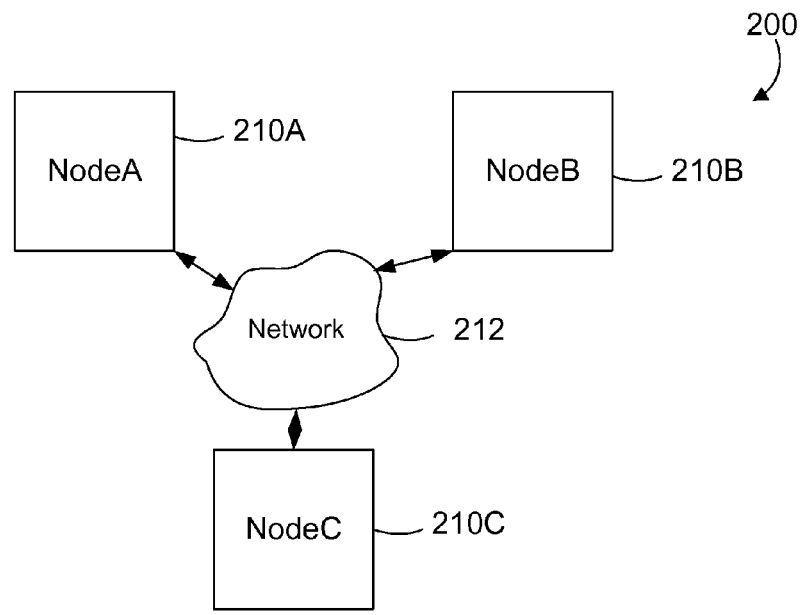
FIG. 2 is a block diagram that illustrates three compute nodes connected in a generic multi-nodal computer environment.

FIG. 2 illustrates a block diagram of a generic multi-nodal computer environment 200. The multi-nodal computer environment 200 is shown with three nodes 210A, 210B, 210C connected with a network 212. The network 212 can be any suitable network to connect the nodes 210 for distributed computing. Each node may represent a computer 100 with some or all the hardware, and memory components as shown in FIG. 1. Alternatively, each node of the computer system 200 could also represent a single node of a massively parallel computer such as IBM® Corporation's Blue Gene® computer system, or a node of a scalable performance cluster such as a Beowulf cluster. At least one node preferably includes a relocation mechanism 124 (FIG. 1) that allocates processing units to the various nodes as described and claimed herein.

Figure 3:
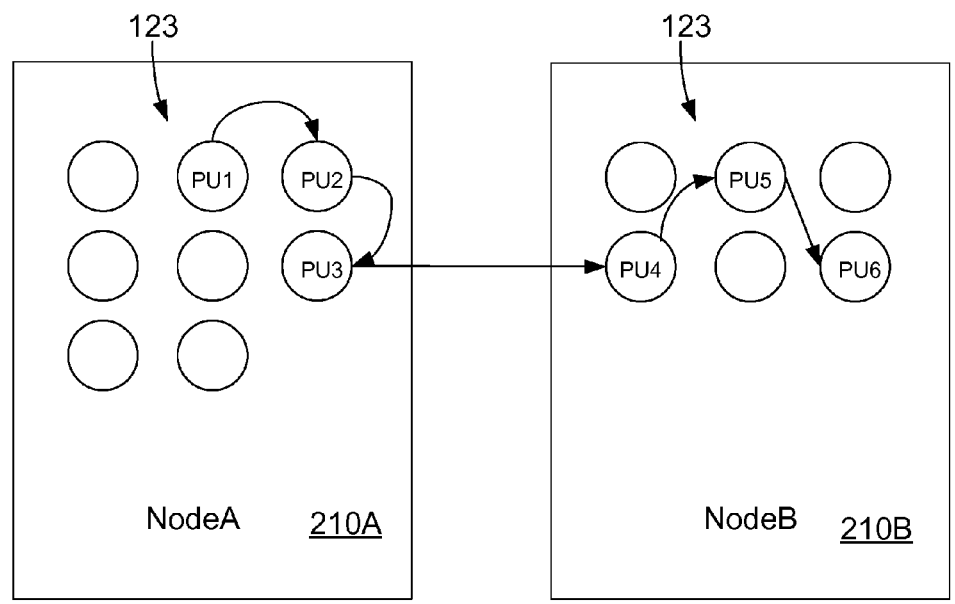
FIG. 3 is a block diagram that shows data relationships between processing units on two compute nodes.

FIG. 3 is a block diagram that shows data flow between processing units 123 and the relationship of processing units on two compute nodes 210A, 210B. In this simple example, NodeA 210A has 8 processing units 123 and NodeB 210B has 6 processing units 123 currently executing on the nodes. Processing units PU1 through PU6 may collectively represent an application as it executes and passes data either on a single node or multiple nodes. The arrows between the processing units 123 indicate the flow of data. Thus data from PU1 flows to PU2 and then to PU3. Data coming into a processing unit is processed such that the data flowing to the next processing unit may be different. Thus as illustrated in FIG. 3, a processing unit may be communicating data to processing units on the same node or different nodes. The relocation mechanism monitors the data flow between processing units in order to dynamically route the processing unit to another node based on the type of physical data or pattern of data flowing into the processing unit. The data flowing into a processing unit may be from a processing unit on the same node or a different node as shown in FIG. 3.

Figure 4:
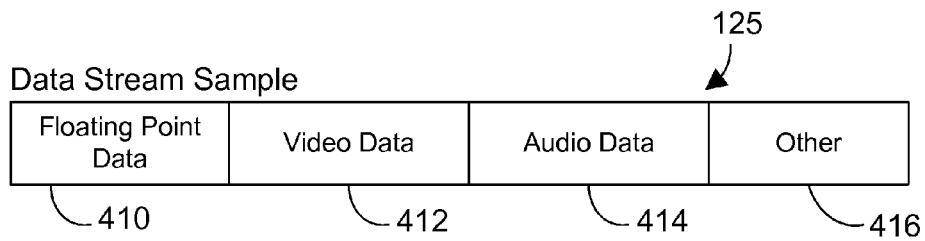
FIG. 4 is a block diagram that shows an example of a data stream sample from data flowing into a processing unit.

FIG. 4 illustrates a graphical representation of a data stream sample record 125. The data stream sample record 125 is used by the relocation mechanism 124 to determine the type of data flowing between processing units as described herein. The data stream record 125 may be a file or record that represents data monitored or sampled by the relocation mechanism 124. The data stream record 125 may be stored in memory 120 (FIG. 1) or in a data storage device 155 (FIG. 1). The data stream record 125 may include any number of data types. In the illustrated example, the data stream record 125 includes the following data types: floating point data 410, video data 412, audio data 414 and other data 416. The data stream records 125 may be stored in any suitable format.

Figure 5:
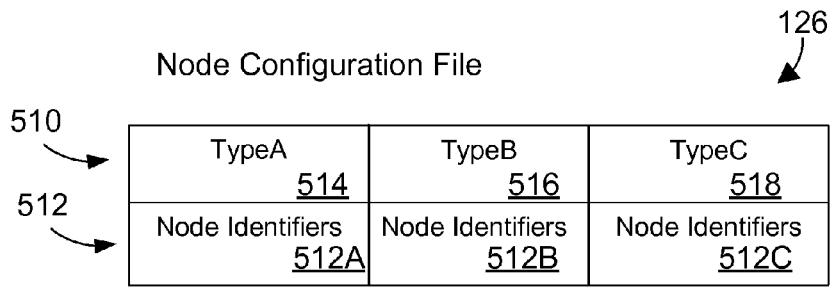
FIG. 5 is a table that represents a node configuration file used by the relocation mechanism.

FIG. 5 illustrates a table that represents one suitable implementation of a node configuration file 126 used by the relocation mechanism 124 (FIG. 1). The node configuration file 126 may be a table or file of records stored in memory or in a data storage device. In the illustrated example, the node configuration file 126 includes a number of node types 510 with an associated list of node identifiers 512. In the illustrated example shown in FIG. 5 the nodes type are TypeA 514, TypeB 516 and TypeC 518. A list of node identifiers 512A, 512B, 512C corresponding to each of the different node types is stored in the table. The node identifiers may be any type of node or computer identifier used by the computer system to identify the physical nodes of the system.

Figure 6:
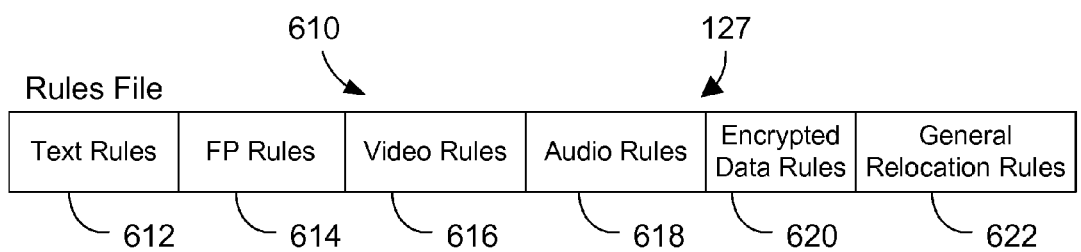
FIG. 6 is a table that represents a rules file used by the relocation mechanism.

FIG. 6 illustrates a table that represents one suitable implementation of a rule file 127 introduced above. The rule file 127 preferably includes one or more rules 610 with relocation criteria for the different data types. The relocation rules 610 are used in conjunction with the preferred nodes 512 by the relocation mechanism 124 to determine where to relocate the processing units. The rules file 127 may be a table or file of records stored in memory or in a data storage device. In the illustrated example shown in FIG. 6 the rules 610 include text rules 612, floating point rules 614, video rules 616, audio rules 618, encrypted data rules 620 and general relocation rules 622. The general relocation rules 622 may includes rules that would apply to any type data, and may also include a default node type indicating the type of node that most data should go to if other rules don't apply.

Again referring to FIG. 6, the rules 610 can be preset or set up by a system administrator to optimize when to relocate the processing units. For example, the data specific rules may include specific thresholds for the amount of data being sent to the processing unit to justify relocation of the processing unit. There may also be logic in the rules to cover sampled data that has more than one type of data or a pattern of data. The following are some examples of rules:
1. (text rule) If greater than 90% of the sampled data is text data, then a node of type A is preferred.
2. (video rule) If greater than 50% of the sampled data is video data, then a node of type B is preferred.
3. (general rule) If greater than 25% of the incoming "records" sampled contain a particular optional attribute of an image (e.g. a jpeg), then node type C is preferred.
4. (general rule with pattern of data) If the percentage of total bytes in the sampled data that is text is greater than 10 times the percentage that is floating point data, then node type A is preferred, otherwise node type C is preferred.

Other rules can be similarly crafted for each of the rule types.

Figure 7:
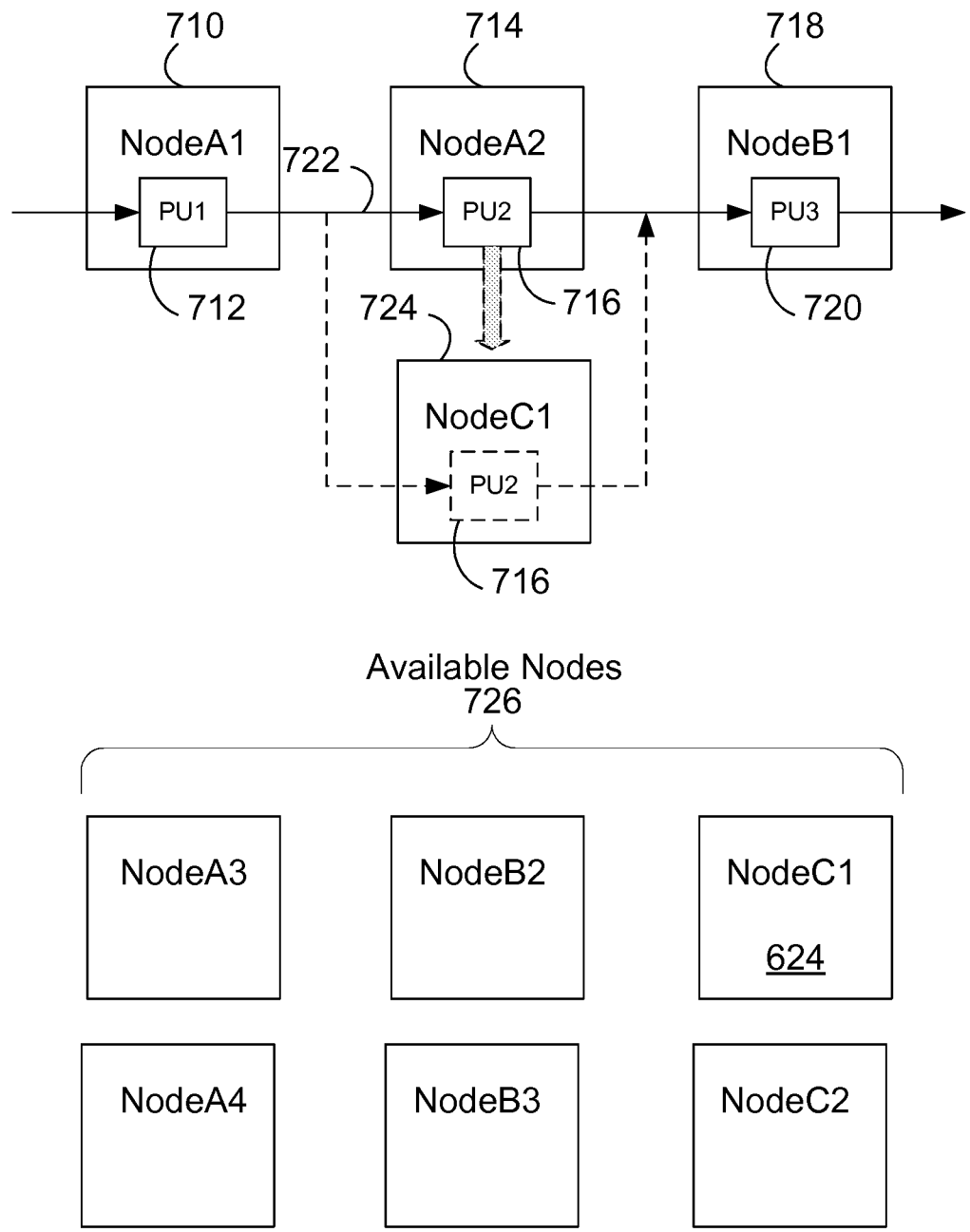
FIG. 7 is an example of relocating a processing unit in a multi-nodal computer environment as claimed herein.

FIG. 7 illustrates an example of a relocation mechanism for a multi-nodal computer environment relocating a processing unit to a different node based on incoming data to the processing unit as claimed herein. In this example NodeA1 710 of node type "A" has a first processing unit (PU2) 712 processing data and sending data to NodeA2 714, which has a second processing unit (PU2) 716. The second processing unit then sends data to a third processing unit (PU3) 720 in NodeB1 718. The relocation mechanism monitors the data flowing into the processing units 712, 716, 720. In this example, we assume that the relocation mechanism samples the data stream 722 flowing into the second processing unit and determines that this data includes video data. The relocation mechanism determines from the node configuration file 126 and the rules files 127 (FIGS. 1 and 5) that the preferred node type to process video data is a node of node type "C". The relocation mechanism then determines there is an available node (NodeC1) of node type "C" in the pool of available nodes 726. NodeC1 is then prepared for execution and the second processing unit (716) is started on NodeC1 724. Data from the first processing unit 712 is then rerouted to the second processing unit 716 now on NodeC1724.

Figure 8:
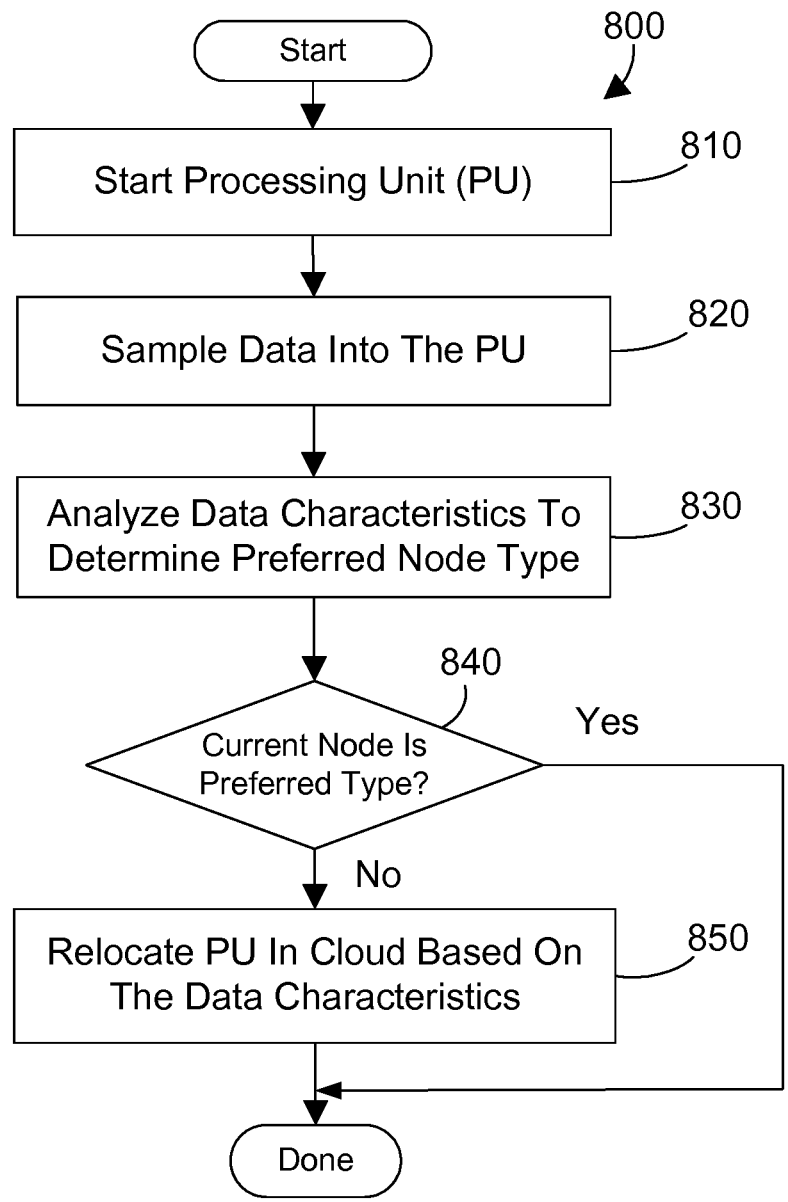
FIG. 8 is a method flow diagram for a relocation mechanism for a multi-nodal computer environment as claimed herein.

FIG. 8 shows a method 800 for dynamic job relocation in a distributed computer system in a multi-nodal environment based on incoming physical data as claimed herein. The steps in method 800 are preferably performed by the relocation mechanism 124 (FIG. 1), but portions of the method may also be performed by other software associated with the computer system. First, start or run a software application, which causes the processing units of the software application to be processed (step 810). Next, monitor the data that flows in and out of the processing units, preferably by periodic sampling of the data (step 820). Then analyze data characteristics of the sampled data and with respect to the preferred nodes and relocation rules in the node configuration file to determine a preferred node for executing the processing unit (step 830). If the current node is the preferred node type (step 840=yes) then the method is done. If the current node is not the preferred node type (step 840=no) then relocate the processing unit to a preferred node in the cloud based on the data characteristics in the sampled data and the rules in the node configuration file (step 850). The method is then done.

Figure 9:
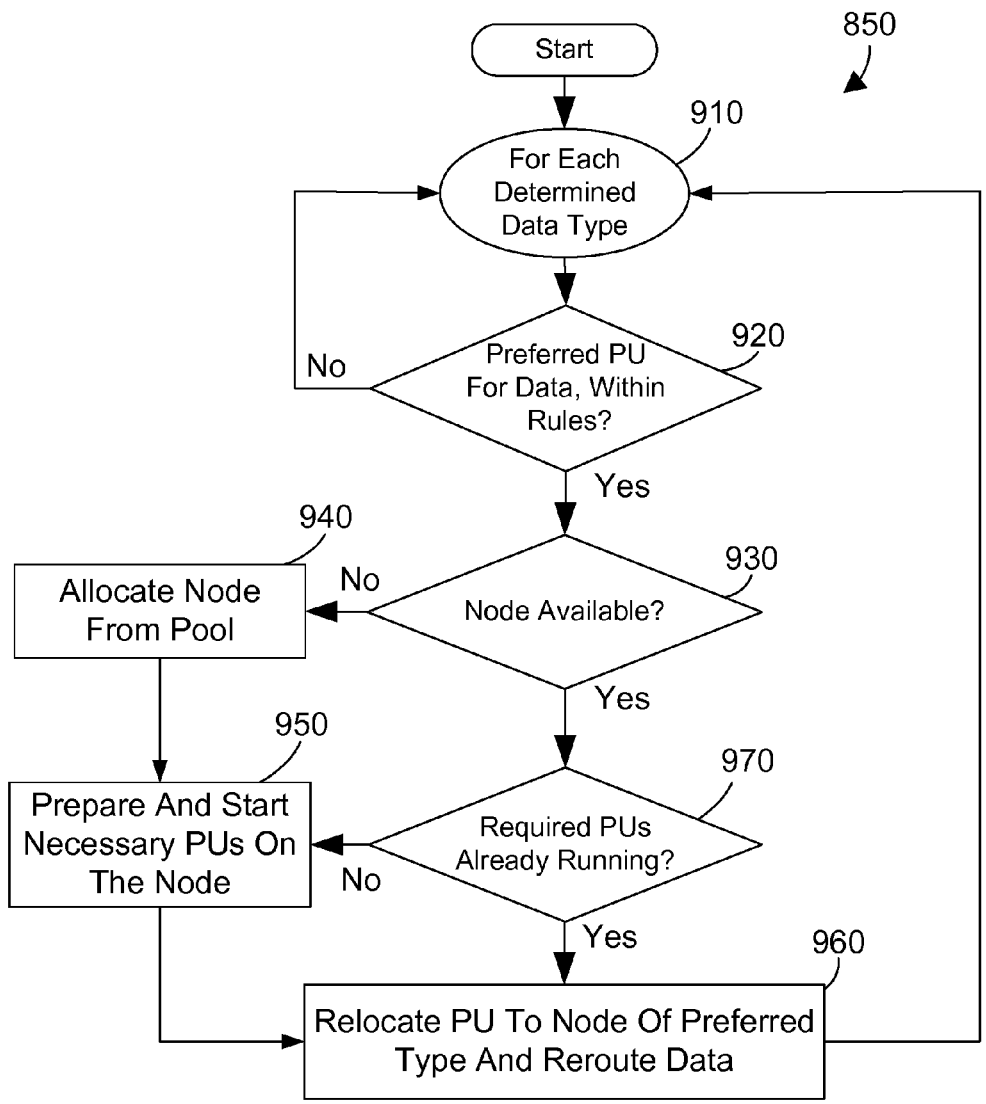
FIG. 9 is an example of a method flow diagram for a relocation mechanism to relocate processing units to another node according to step 850 in FIG. 8.

FIG. 9 shows a method 850 for relocation processing units to a preferred node in a multi-node cloud based on the data characteristics in the sampled data. Method 850 is an example of performing the step 850 in FIG. 8. The steps in method 850 are preferably performed by the relocation mechanism 124 (FIG. 1), but portions of the method may also be performed by other software associated with the computer system. Method 850 is performed for each data type determined by analyzing the sampled data in step 830 (step 910). If there is no preferred processing units for the determined data type within the rules in the node configuration file (step 920=no) then go back to step 910 for the next data type. If there is a preferred processing unit for the determined data type within the rules in the node configuration file (step 920=yes) then determine if a preferred node is available for the determined data type (step 930). If a preferred node is not available for the determined data type (step 930=no) then allocate a node of the preferred type from the node pool (step 940), then prepare and start the necessary processing units on the allocated node (step 950) and relocate the processing unit to a node with the preferred node type and reroute data flow to the processing unit on the relocated node (step 960). If a preferred node is available for the determined data type (step 930=yes) then determine if the required processing units are already running (step 970). If the required processing units are already running (step 970=yes) then relocate the processing unit to a node with the preferred node type and reroute data flow to the processing unit on the relocated node (step 960) and return to step 910. If the required processing units are not already running (step 970=no), then prepare and start the necessary PUs on the node (step 950) then relocate the processing unit to a node with the preferred node type and reroute data flow to the processing unit on the relocated node (step 960) and return to step 910. The method is done when all the determined data types have been processed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, a relocation mechanism dynamically relocates processing units (job) in a distributed computer system in a multi-nodal environment based on incoming physical data into a processing unit on a node. The relocation mechanism monitors physical data flowing into a processing unit and dynamically relocates the processing unit to another type of node within the 'cloud' of nodes based on the type of physical data or pattern of data flowing into the processing unit. The enables the multi-nodal system to maximize efficiency by having processing units that are processing a specific data type to be executed on a node of the preferred node for that data.

One skilled in the art will appreciate that many variations are possible within the scope of the claims. While the examples herein are described in terms of time, these other types of thresholds are expressly intended to be included within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method for relocating processing units in a multi-nodal computer system, the method comprising the steps of:
   starting a processing unit on a compute node of the multi-nodal computer system with a data flow into the processing unit wherein the processing units are part of an application executing on the compute node;
   sampling the data flowing into the processing unit to produce sampled data;

analyzing the sampled data to determine data types in the sampled data; and dynamically relocating the processing unit to a different node of a different node type based on the determined types of data flowing into the processing unit.

2. The method of claim 1 further comprising the steps of:

for each determined type of data, determining if there is a preferred node type for processing the data of the determined type;

determining if there is a node available of the preferred node type;

where there is no node available of the preferred node type, allocating a node of the preferred node type, and preparing and starting a processing unit on the allocated node; and dynamically relocating the processing unit to the preferred node and rerouting the data flow to the preferred node.

3. The method of claim 1 further comprising the step of: determining if the required processing units are already running where there is a node available of the preferred node type and where they are not already running preparing and starting a processing unit on the allocated node.

4. The method of claim 1 wherein the step of analyzing the data to determine the data types includes determining text data, floating point data, video data, audio data and encrypted data.

5. The method of claim 1 further comprising a rules file containing a plurality of relocation rules that defines criteria for relocating the processing units depending on different types of data in the data flow.

6. The method of claim 1 further comprising the step of utilizing a node configuration file containing a preferred node list for a plurality of preferred node types, and choosing the different node for relocating the processing unit from the preferred node list corresponding to the preferred node type.

7. A computer-implemented method for relocating processing units in a multi-nodal computer system, the method comprising the steps of:

starting a processing unit on a compute node of the multi-nodal computer system with a data flow into the processing unit wherein the processing units are part of an application executing on the compute node;

sampling the data flowing into the processing unit to produce sampled data;

analyzing the sampled data to determine data types in the sampled data;

dynamically relocating the processing unit to a different node of a different node type based on the determined types of data flowing into the processing unit;

for each determined type of data, determining if there is a preferred node type for processing the data of the determined type;

determining if there is a node available of the preferred node type;

where there is no node available of the preferred node type, allocating a node of the preferred node type, and preparing and starting a processing unit on the allocated node; and dynamically relocating the processing unit to the preferred node and rerouting the data flow to the preferred node; and determining if the required processing units are already running where there is a node available of the preferred node type and where they are not already running preparing and starting a processing unit on the allocated node.

8. The method of claim 7 wherein the step of analyzing the data to determine the data types includes determining text data, floating point data, video data, audio data and encrypted data.

9. The method of claim 7 further comprising a rules file containing a plurality of relocation rules that defines criteria for relocating the processing units depending on different types of data in the data flow.

10. The method of claim 7 further comprising the step of utilizing a node configuration file containing a preferred node list for a plurality of preferred node types, and choosing the different node for relocating the processing unit from the preferred node list corresponding to the preferred node type.

* * * * *